United States Patent [19]

Cohen et al.

[11] Patent Number: 4,853,863

[45] Date of Patent: Aug. 1, 1989

[54] DEVICE TO MEASURE THE RELATIVE POSITION AND ATTITUDE OF TWO BODIES

[76] Inventors: Edwin Cohen, Five Crestmont Rd., Binghamton, N.Y. 13905; Brian J. Woycechowsky, 2633 Purdue Dr., Vestal, N.Y. 13850

[21] Appl. No.: 39,172

[22] Filed: Apr. 17, 1987

[51] Int. Cl.[4] ............................................. G06F 15/31
[52] U.S. Cl. ...................................... 364/460; 364/559
[58] Field of Search .............. 364/460, 559, 516, 578; 434/30, 33, 51, 55

[56] References Cited

U.S. PATENT DOCUMENTS

| | | | |
|---|---|---|---|
| 4,238,828 | 12/1980 | Hay et al. | 364/516 |
| 4,578,757 | 3/1986 | Stark | 364/461 |
| 4,672,564 | 6/1987 | Egli et al. | 364/559 |
| 4,685,054 | 8/1987 | Manninen et al. | 364/559 |
| 4,751,662 | 6/1988 | Crosbie | 364/578 |

*Primary Examiner*—Parshotam S. Lall
*Assistant Examiner*—Thomas G. Black
*Attorney, Agent, or Firm*—Kenyon & Kenyon

[57] ABSTRACT

A method of determining the position and attitude of a first body, e.g. a body movable in six degrees of freedom, with respect to a second body comprising establishing three or more reference points which are not colinear on the first body, establishing three or more reference points which are not colinear on the second body and measuring at least six of the distances or angles between the reference points on the two bodies to determine the relative position and attitude of the two bodies.

30 Claims, 6 Drawing Sheets

DEVICE TO MEASURE THE RELATIVE POSITION AND ATTITUDE OF TWO BODIES

BACKGROUND OF THE INVENTION

This invention relates to position and attitude measurement in general, and more particularly to an improved method and apparatus for measuring the relative position and attitude of one body with respect to another.

For example, at the present time, the position and attitude of six degree of freedom (6 DOF) motion bases used in flight simulation are determined from measured leg extensions using equations that are essentially the inverse of those used in driving the legs. This determination is less credible than an independent determination. One reason is that, if a leg or leg attachment fails, the measured leg extension on such a leg may be within acceptable limits of the commanded leg extension. Therefore, such a platform failure would not be sensed by a system which determines platform position and attitude from measured leg extensions. A second reason is that any error in the basic equations used to determine commanded leg extensions from a desired 6 DOF motion base position and attitude would be reflected in the inverse solution. This is, of course, a consequence of a non-independent measurement.

There have been other systems developed in the past utilizing light or sound energy for determining distance and position. One simple example of this is the Polaroid cameras which utilize ultrasound for determining distances for taking photographs. Another example is the system disclosed in U.S. Pat. No. 3,352,223 in which three lasers are utilized to determine the attitude and altitude of an instrumented aerospace vehicle with respect to an uninstrumented planetary or lunar surface. This device permits only obtaining pitch and roll angles but not the heading or the azimuth of the vehicle and the local vertical distance or altitude but not the latitude and longitude, or the coordinates of the point on the surface directly below the vehicle and from which the local vertical distance is measured.

Thus, the use of beams of electromagnetic energy to determine distance has been used in the past and is still finding applications.

An article, starting on page 69 of the Mar. 1, 1982 issue of *Aviation Week and Space Technology* entitled: "USAF Seeks Increased Robot Precision", describes a device for positioning the end effector of a robot with respect to its target on a workpiece for the purpose of issuing corrective commands to the robot's controller. This device uses a "coarse vision sensor consisting of one General Electric 2200 binary camera and a Digital Equipment Corp. 11/03 minicomputer" as a coarse sensor and "a fine resolution system comprising three General Electric 2200 cameras, each resolving a 1 sq. in. area, and a Motorola 6800 minicomputer."

Ultrasonic ranging systems, per se, are available, for example, from the Polaroid Corporation, Ultrasonic Components Group. These operate over distances up to 35 feet. However, such systems have not been applied in apparatus such as motion systems and the like.

Thus, there is a need to independently determine the relative position and attitude of one body with respect to another in all six degrees of freedom (three in translation and three in rotation) that exist between two bodies.

In particular, there is a need to independently measure the relative position and attitude of 6 DOF flight simulation motion bases.

OBJECTS OF THE INVENTION

The object of the present invention is to provide an accurate, real-time measurement of the relative position and relative attitude of two systems which are movable with respect to each other. While the example application of the present invention is the determination of the position and attitude of a 6 DOF motion system without using measured leg extensions, the present invention has much wider application; for example, it can be used to determine the position and attitude of the large manipulator arm of a space shuttle, or of an industrial robot. Further, it is useful for the purpose of aircraft or dredge station keeping. An example of a desired station keeping application is aircraft station keeping during in-flight refueling.

SUMMARY OF THE INVENTION

The present invention determines the position and attitude of one body or system (e.g., a 6 DOF motion platform) with respect to another body (e.g., the floor upon which the 6 DOF motion platform rests). This determination is based on the principle that any body or system can be represented by a triad of mutually perpendicular axes (called an axes system) whose origin and axes are fixed within the body. Thus, the relative position and attitude of two bodies can be established by first associating an axes system with each body, and then representing the relative position and attitude of two bodies in terms of the (x,y,z) coordinates of the origin of one of the axes systems and its attitude as measured with respect to the other axes system. Further, because such representation is relative, the axes system representing one of the bodies or systems can be arbitrarily called the fixed axes system; and the other axes system, representing the other body or system, can be called the moving axes system. In the case of the relative displacement of a 6 DOF motion platform with respect to the floor upon which it rests, it is natural to refer to a 6 DOF motion platform as the moving body, and its associated axes system as the moving axes system. The floor (or earth) is then referred to as the fixed body, and its associated axes system is referred to as the fixed axes system. With this choice of association of moving and fixed axes systems, the position and attitude of a 6 DOF motion platform is specified in terms of the fixed or earth axes (x,y,z) coordinates of the origin of the moving or platform axes, and by the attitude of the moving platform axes system with respect to the fixed or earth axes systems. A way in which the attitude of the moving axes system can be specified with respect to the fixed axes system is to state the heading, pitch, and roll angles of the moving axes system with respect to the fixed axes system.

This determination of the relative position and attitude of the two bodies can be done in either of two ways:

1. By measurement of the distance from each of three non-colinear points in the fixed axes system to each of three non-colinear points in the moving axes system. These distance measurements can be made by measuring the travel time of electromagnetic or sound signals which are emitted from each of three non-colinear located emitters on the first body to each of three non-colinear points on the second body. This measurement can be instrumented either by placing sensors at each of the three points on the second body, or by placing retroflectors on the second body and sensors, co-located with the emitters, on the first body. These distances can also be measured by laser range finders or by measuring the Doppler effect of such emitted signals as sensed by each of three non-colinear located sensors on the second body. Yet another method of obtaining these distances is to measure the extension of strings between each of three points on the first body to each of the three points on the second body. Linear changes in this case can be converted to rotation via a pulley and shaft encoder, or the string can actually be a tape containing position coding analogous to that of shaft angle encoders. Thus, instead of using pulse travel time as a measure of the distance between a point on the motion platform and a point on the fixed reference, the length of a string connecting the two can be determined. This is done by fixing the string at one point (say, at the motion platform) and running it around a spring-loaded spool or drum (to keep it taut) at the other point. As the two points change their separation, the spool or drum will perforce rotate; measuring this rotation will (after initial calibration) yield the distance between the two points. Some restriction on relative motion of the two bodies is needed to prevent strings from touching each other; however, even if two strings do touch, the other seven will provide sufficient data.

Since each string noted above automatically aligns itself in the direction between the two points, they can be used to aim off-the-shelf laser range-finders in a direction parallel to the string and close to it so as to measure the distance between the two points.

2. Instead of measuring distances, angles associated with three non-colinear points on one body and three non-colinear points on the other body can be used. For example, these angles can be measured by means of potentiometers or digital optical encoders.

Because only six of the nine possible geometric parameters, i.e., distance measurements described in 1. above or six of the nine possible angles described in 2. above are required to completely determine the relative position and attitude of the two bodies, three of the nine possible measurements are redundant. This redundancy of information can be used to calculate up to 66 sets of relative distances and attitudes between two bodies. Since up to 65 redundant evaluations of relative position and attitude can be made, redundant evaluations allow bad measurements to be discarded through the use of voting procedures. After discarding discrepant values of relative position and attitude, the remaining values can be averaged by means of Kalman filtering. If more than three emitters or receivers are employed (e.g., to ensure the functioning of at least three of each), similar use could be made of the redundant data.

The alternate approaches for making the measurements necessary to determine the relative position and attitude of two bodies is shown in the tree of FIG. 1. In the case of electromagnetic or sound waves, the travel time of a chosen wave is derived from the difference between the time an electromagnetic or sound signal is emitted and sensed; the distance between emitter and receiver is then determined by multiplication of the travel time by the wave velocity (electromagnetic or sound).

It is shown herein that the three distances from one point to the first body to three points on the second body, e.g., three distances which are sensed from a given emitter by the three sensors, are necessary and sufficient to determine the coordinates of that emitter point in the fixed axes system (e.g., an earth axes system). It is also shown herein that the fixed axes system coordinates of three non-colinear points are necessary and sufficient to determine the position and attitude of the moving axes system (e.g., a 6 DOF motion platform) with respect to a fixed axes system (e.g., an earth axes system). The fundamental equations which must be solved for each of the three points on the first body are:

$$(x-x_1)^2 + (y-y_1)^2 + (z-z_1)^2 = R_1^2$$

$$(x-x_2)^2 + (y-y_2)^2 + (z-z_2)^2 = R_2^2$$

$$(x-x_3)^2 + (y-y_3)^2 + (z-z_3)^2 = R_3^2$$

where $(x,y,z)$ are the unknown coordinates of a given point on the first body, $(x_1,y_1,z_1)$ are the known coordinates of the first point on the second body, $(x_2,y_2,z_2)$ are known coordinates of the second point, $(x_3,y_3,z_3)$ are the known coordinates of the third point, and $(R_1,R_2,R_3)$ are the respective distances from a given point of the first body to the first, second and third points on the second body.

The completely independent method of measurement in accordance with the present invention, provides a convenient means of determining platform position and attitude, as well as the time rates of change of position and attitude. This independent determination has many uses, some of which are: the verification that the 6 DOF motion base is being driven in a desired manner, and assessment of whether or not the state of motion of the 6 DOF motion base has exceeded safe limits, and the generation of error signals that would close the overall 6 DOF motion base servo loop. Moreover, the present invention is not limited to systems whose position (relative to some fixed axes system, such as the earth's) is determined by actuator extension or the like; but can be used to determine, for any two systems, their relative position and attitude, and derivatives of position and attitude, for example, velocity and acceleration. The only limitation is that the dimensions of either system are not negligible when compared with the distance between the two systems.

DETAILED DESCRIPTION

Figure 1:
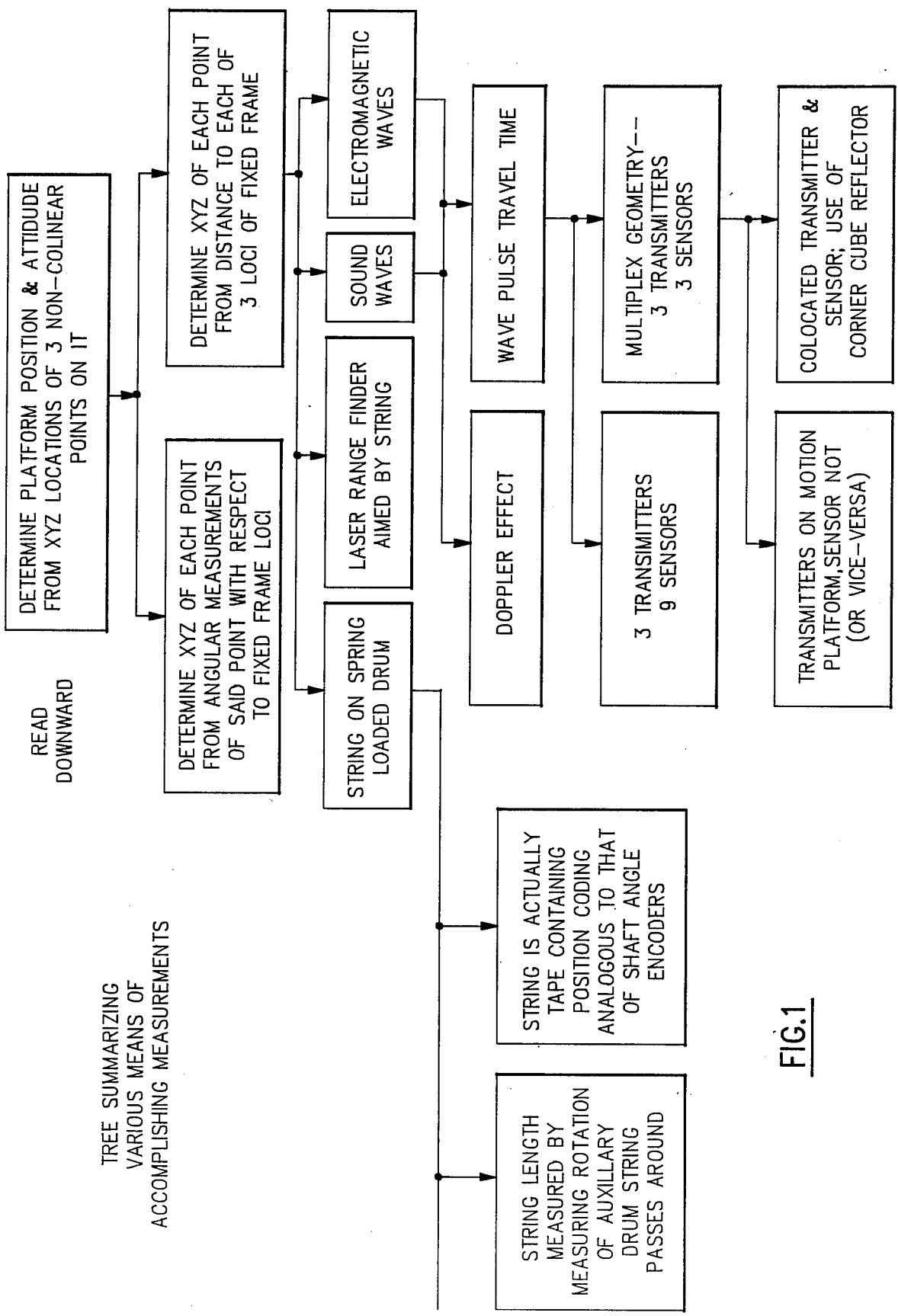
FIG. 1 is a tree summarizing the various means of accomplishing the measurements that will determine the relative position and attitude of two bodies.

The method by which the determination of the relative motion between two axes systems 11 and 13 is made (in the example being described in FIG. 2, the moving axes system 13 is the 6 DOF motion platform 15 and the fixed axes system 11 is the earth) is based on the fact that the coordinates of a given point in the moving axes system can be fixed (or determined) by that point's distance from each of three points whose fixed axes system coordinates are known. In terms of the specific example being used to describe the invention, this can be stated: the earth axes X, Y and Z location of a given point, e.g., the point E1 at the origin of axes system 13 on 6 DOF motion platform 15 can be fixed (or determined) by that point's distance from each of three points whose earth axes coordinates are known, e.g., the points $S_1$; $S_2$ and $S_3$ of axes system 11. The attitude of a moving axes system with respect to a fixed axes system is uniquely determined by the location of three such points, provided these points do not all lie on the same straight line. Thus, once the coordinates of the three non-linear points on the motion platform are determined with respect to the earth axes, the attitude of the motion platform is uniquely determined. In this case, we can consider points $E_1$, $E_2$ and $E_3$ of axes system 13.

Before proceeding, let the verification of the above statements be given consideration. First consider why the distances of an unknown point from three unique and known non-colinear points are necessary to determine its coordinates. If only the distance from one known point is given, the unknown point, e.g., $E_1$ of axes system 13 can lie anywhere on the surface of a sphere centered at the known point, e.g., $S_1$ of axes system 11, whose radius is the given distance. If the distances from two unique, known points are given, e.g., from points $S_2$ and $S_3$, the point can lie anywhere on the circumference of a circle 17 whose radius is the perpendicular distance from the unknown point to the line 21 joining the two known points. The same is true if the distances from any number of unique, known points which lie on the same straight line are given. The exception to this general rule is when the unknown point lies on the same straight line as the known points. Then the radius of the circle is zero and the unknown point can be uniquely determined. However, this unique case will seldom (and may even never) occur. The imposition of the requirement of knowledge of the distance from a third, non-colinear known point uniquely determines the position of the unknown point on the circumference of the circle determined by the knowledge of the distances of the unknown point from the first two known points.

Next, consider why the attitude of the 6 DOF platform is uniquely determined once the earth axes coordinates of three non-colinear points fixed to the motion platform are known. If the points are colinear, the 6 DOF platform has an unknown roll angle with respect to the known line. The earth axes coordinates of the third non-colinear motion platform point fixes the roll of the 6 DOF platform.

Finally consider why the earth axes referenced position and attitude of any three dimensional axes system fixed to the 6 DOF platform are determined by the earth axes coordinates of any three non-colinear points whose 6 DOF platform axes coordinates are fixed. Any one of the three points whose 6 DOF platform axes are fixed can be taken as the origin of an axes system which is parallel to any specified axes system which is fixed with respect to the 6 DOF platform. The remaining two points which are fixed with respect to the platform define an axis system, with origin at the first point, whose attitude differs from the specified platform axes by a constant rotation about an axes whose platform axes attitude is fixed. Since this rotation and axis are uniquely determined once the desired 6 DOF platform axes is specified and the three fixed platform points are specified, the specified 6 DOF platform axes differs from the platform axes specified by the three fixed platform points by a fixed rotation and a fixed translation.

These distances can be determined by measuring how long it takes for a pulse of light, or other source, to travel from emitters E1–E3 on the platform to sensors S1–S3 on the walls or ceiling of the simulator room. By using a rapid succession of pulses, the measurement is virtually continuous. For purposes of illustration, we shall describe a preferred configuration:

a. using light (actually infrared) rather than sound,
b. placing the emitters E1–E3 on the motion platform and the sensors on the walls or ceiling of the simulator room 16, rather than the reverse, and
c. using the same three sensors S1–S3 (multiplexed) as reference points for all three platform mounted emitters, rather than employing three trios of sensors.

Each of the three infrared emitters E1–E3 emit pulses at the same rate; these pulses are staggered so that the time between pulses from different emitters exceeds the maximum time of travel of light from emitter to sensor, corresponding to maximum distance. This enables the sensors to identify the emitter unambiguously.

In the simulator room, this distance cannot exceed 50ft, so the pulses have to be separated by at least 50 picoseconds. Hence, a given emitter can have a between pulse time as low as 150 picoseconds, corresponding to a PRF of about $6 \times 10^6$ Hz—orders of magnitude faster than required for the simulator application. The actual PRF required to assure that the system motion between pulses is less than 0.04", assuming the system has a maximum velocity of 24" per second, is $$3 \times \frac{24}{.04} = 1800 \text{ Hz.}$$

For purposes of exposition, let us assume that the three emitters E1, E2 and E3 are located on top of the motion platform, E2 at the left front, E3 at the right front, and the E1 at the rear center on the cockpit 23; and the three sensors S1, S2 and S3 are located at the junction of the simulator room's walls and ceiling. If necessary, the emitters may be elevated to insure that each emitter can illuminate each sensor irrespective of the position and attitude of the motion platform.

Figure 2:
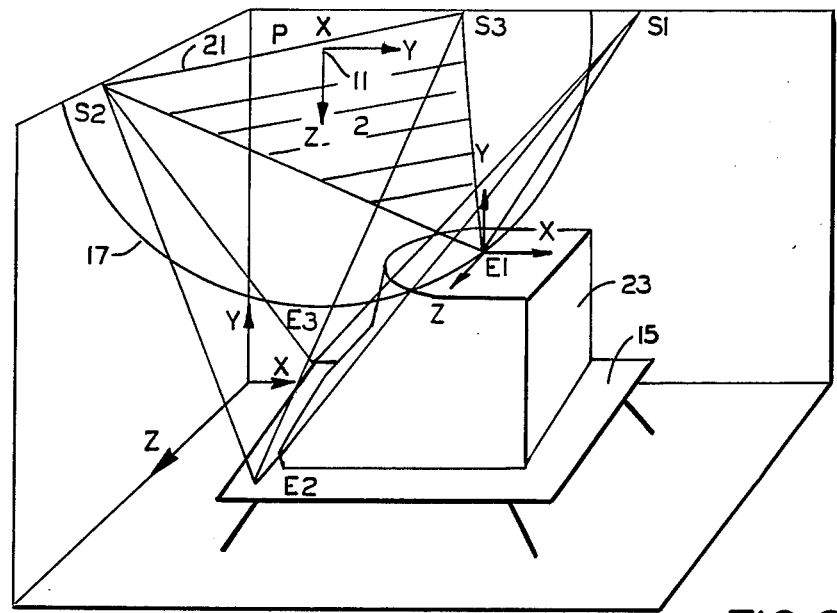
FIG. 2 is a perspective drawing of the system of the present invention as applied to the motion platform of a flight simulator.

The 6 DOF motion platform translates and rotates with respect to the earth. The invention described herein measures this translation and rotation. In order to describe the manner in which this is done, consider two three dimensional, orthogonal, right-handed axis systems, one system 11 fixed with respect to the earth, the other 13 fixed with respect to the 6 DOF motion platform as shown in FIG. 2. Let the axis system which is fixed with respect to the earth be called the earth axis system, and the axis system which is fixed with respect to the platform be called the platform axis system. It is desired to establish the translation and rotation of the platform axis system with respect to the earth axis system. This is a specific example of the general problem of establishing the translation and rotation of a moving axis system with respect to a fixed axis system. Since motion is relative, the choice of which axis system is fixed and which is moving is completely arbitrary. Thus, the invention described herein can be applied to the general problem of determining the relative motion of two bodies whose separation does not greatly exceed the dimensions of the smaller body.

Figure 3:
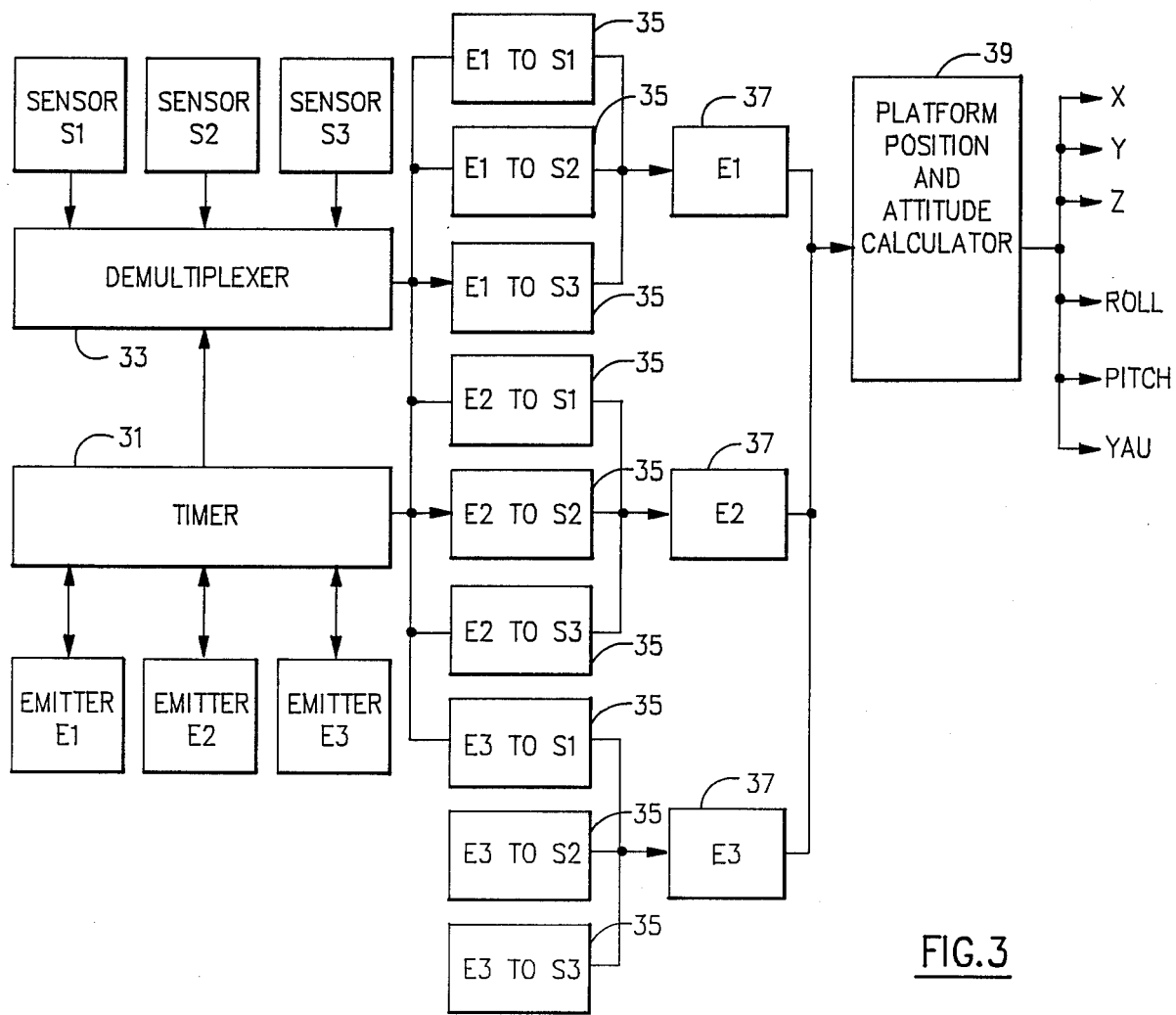
FIG. 3 is a block diagram for implementing the system of FIG. 2.

Referring to FIG. 3, timer 31 controls the emission of pulses, providing pulses A, B, C, A, B ... from emitters E1, E2 and E3 with a PRF of, say, 1800 Hz.

Each of these pulses is received by sensors S1, S2 and S3; pulse emission and arrival times are "logged" in the demultiplexer which sorts out the emission and arrival times associated with each of the nine combinations of emitter and sensor using a reference input from timer 31. Since the demultiplexer 33 is some distance from each of the sensors and emitters, it does not receive the signal that the emitter has emitted or that the sensor has sensed an emission simultaneous with the event; hence, the true event time has to be calculated by subtracting signal time-of-travel from signal arrival time. The six signal time-of-travel times (three emitter, three sensor) can be determined from cable lengths or by calibration; once determined, they will remain fixed as long as connecting cables are not replaced.

The multiplexer 33 supplies each of the pulse travel time calculators 35 with the appropriate times of emission and reception or sensing; the pulse travel time calculator 35 subtracts the emission time from the sensed time to get the travel time. The three travel times from each emitter are then fed to an associated emitter position calculator 37 which first translates the travel times to emitter to sensor distances by multiplying these times by the velocity of light, and then, from these three distances, calculates the XYZ coordinate of each emitter. The mathematical procedures by which the XYZ coordinate of a given emitter can be evaluated is shown below. All of these calculations are done in an appropriate micro- or minicomputer.

Figure 4:
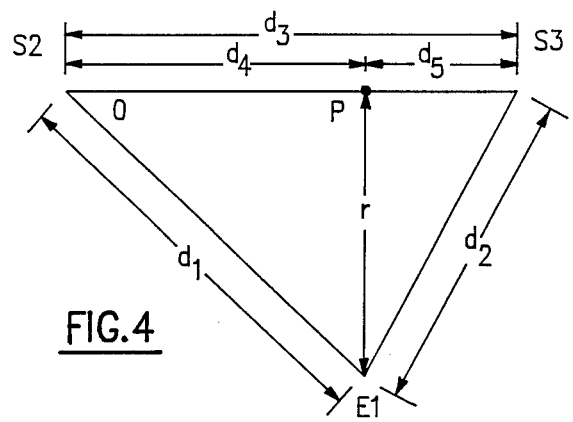
FIGS. 4 and 5 are diagrams helpful in understanding the trigometric relationships in the system of FIG. 2.

The three sensors S1, S2 and S3 may be located at position shown in FIG. 2 in the room 16. Any two of the sensors, say S2 and S3; an emitter point, say E1; and the projection of E1 on the line S2–S3, form the plane shown shaded in FIG. 2. This plane is also shown in FIG. 4. The distance from S2 to E1, is $d_1$; from S3 to E1, is $d_2$, and the distance from S2 to S3, say $d_3$, are all known. Therefore, the distance between the point P where a line from E1 perpendicular to S2–S3 intersects S2–S3, and E1 can be determined by trigonometry. Since three sides of the triangle S2, S3, E1 are known, the angle $\theta$ can be determined from the law of cosines:

$$\theta = \text{arc cosine} \frac{d_1^2 + d_3^2 - d_2^2}{2d_1d_3}$$

The distance r from E1 to P, is then given by:

$r = d_1 \sin \theta$

An alternate method of determining the distance r is to measure the angles $\theta$ and $E_1 S_3 S_2$ shown in FIG. 4. Then the angle:

$S_3E_1S_2 = 180° - \theta - E_1S_3S_2$.

The distance $d_1$ can be determined using the law of sines:

$$d_1 = \sin(E_1 S_3 S_2) \left[ \frac{d_3}{\sin(S_3 E_1 S_2)} \right]$$

and r can then be determined by the previous equation for r.

Having determined r, it is convenient, for the sake of reference, to assign an orthogonal coordinate system to the point P (see FIG. 2), with the X axis directed from S2 to S3, with Y axis in the plane of the ceiling with positive direction on the same side of S2–S3 as sensor S1, and with the positive Z axis directed downward. The points S1, S2 and S3 can always be chosen such that S1 is to the right of the line S2–S3. Therefore, the axes system just defined is right-handed. Let this axes system be called the ceiling axes system. The origin of the ceiling axes system is at P, where the distance from S2 to P along S2–S3 is given by:

$d_4 = d_1 \cos \theta$

Once $d_4$ is known, the ceiling axes can, of course, be easily related to any other earth axes at the site of the motion platform.

Since the origin of the ceiling axes system is at P, the circle 17 defined by r is in the YZ ceiling axes system plane. The ceiling axes system equation of this circle is: $y^2 + z^2 = r^2$ The equation for the points on the surface of a sphere centered at S1 in terms of ceiling axes system coordinates is:

$(x - x_1)^2 + (y - y_1)^2 + (z - z_1)^2 = d_6^2$ where $(x_1, y_1, z_1)$ are the ceiling axes system coordinates of $S_1$ and $d_6$ (see FIG. 5) is the distance sensed by sensor S1 to emitter E1. By virtue of the definition of the ceiling axis system, the value of x for $E_1$ is zero and $z_1 = 0$. Therefore, this last equation can be written:

$y^2 + z^2 - 2yy_1 = d_6^2 - (x_1^2 + y_1^2)$ or, upon substituting for $y^2 + z^2$:

$y = (r^2 + x_1^2 + y_1^2 - d_6^2)/2y_1$

Figure 5:
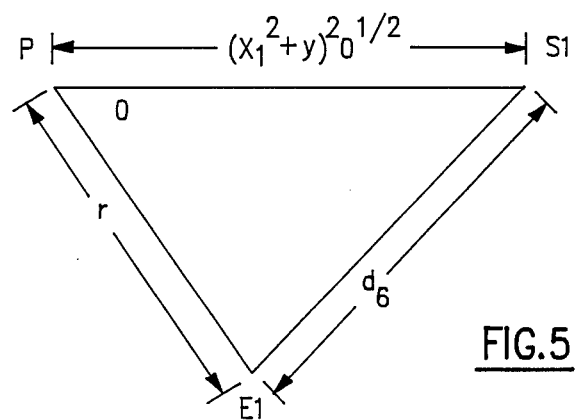

The distance $d_6$, and hence, y, can also be determined by measuring the angle S1 E1 S3 (see FIG. 2), then using previously determined distance $d_4$ and the angle S1E1S3 to determine the angle S1 E1 P, and then using distances $(x^2 + y^2)^{\frac{1}{2}}$ and r (see FIG. 5).

By virtue of the manner in which the ceiling axes system has been defined, $y_1 > 0$ and $y > 0$. Therefore, it must be true that:

$r^2 + x_1^2 + y_1^2 = d_6^2$

The fact that this is true is shown in FIG. 5. FIG. 5 represents the triangle defined by S1, P, and E1. By the law of cosines:

$d_6^2 = x_1^2 + y_1^2 + r^2 - 2(x_1^2 + y_1^2)^{\frac{1}{2}} r \cos \phi$ $\phi$ can only become as large as 90° when E1 lies directly below P, in which case the motion platform would be touching a wall. Thus, the solution for y given above is consistent with the manner in which the ceiling axes system has been defined.

Since $y^2 + z^2 = r^2$, there are two solutions for z:

$z_{1,2} = \pm(r^2 - y^2)^{\frac{1}{2}}$

However, the negative solution can be ignored, since it is known that the motion platform lies below the ceiling. As previously mentioned, in terms of the chosen ceiling axes system, x=0. However, the ceiling axes system coordinates of an emitter can easily be related to any earth axes system at a motion platform site. For convenience of discussion consider the case where the earth axes system is parallel to a ceiling axes system. Since the earth axes are, by definition, fixed relative to the room which contains the motion base, the earth axes system coordinates of S2 are fixed, say $(x_A, y_A, z_A)$ Then, once $d_4$ and the x and y ceiling axes system coordinates of an emitter have been determined, the earth axes system coordinates of that emitter, say $(X_E, Y_E, Z_E)$ are given by:

$$x_E = x_A + d_4$$

$$y_E = y_A + y$$

$$z_E = z_A + z$$

For some applications, it may be desired that the earth axes be rotated with respect to the ceiling axes. However, since the earth axes are fixed, this rotation will be known and fixed. Therefore, the elements of the rotation matrix which transform non-rotated earth axes system coordinates into rotated earth axes system coordinates, say $(x_{ER}, y_{ER}, z_{ER})$, will be known constants. Such a rotation is shown below:

$$\begin{bmatrix} x_{ER} \\ y_{ER} \\ z_{ER} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} x_E \\ y_E \\ z_E \end{bmatrix}$$

where the $a_{ij}$ (i,j=1,2,3) are the fixed direction cosines between the earth axes system and the rotated earth axes system.

The procedure just shown is applicable to any sequence of axis systems which are fixed. Also, the procedure just shown can be repeated for any number of points in a moving axes system whose fixed axes system coordinates are desired.

The resulting three sets of XYZ coordinates (a set for each emitter) are then fed into the platform position and attitude calculator 39, which outputs the XYZ coordinates of some reference point on the motion platform, such as a simulated cockpit's 23 center of motion, as well as the platform's roll, pitch, and yaw values.

The entire process is repeated at a 1800 Hz rate; the outputs of calculator 39 can be stored and/or plotted on a CRT.

We know that in the case of a motion platform, six distances, the lengths of six legs, uniquely determine motion platform translation and attitude with respect to the earth. However, in this use specific legs connect specific earth axes points to specific platform points. In general, as shown above, three distances from one of the emitter points fixes the relative translation of that emitter point in the fixed axes. Two distances from one of the other emitter points fixes the attitude of the moving body with respect to the fixed axes except for roll, and one distance from the third emitter point is required to fix the roll angle of the moving body about the line established by the first five distances.

The number of ways six distances can be chosen from the nine available is the same as the number of ways three can be omitted. The first distance can be omitted nine ways, the second, eight, and the third seven. Since the order of omission is irrelevant, the total number of ways three can be omitted is:

$$\frac{9 \times 8 \times 7}{1 \times 2 \times 3} = 84.$$

Any combination of emitter and receiver that does not use each emitter and receiver at least once, must be subtracted from these 84 combinations. Since such omission involves three terminations from each emitter and receiver, $6 \times 3 = 18$ choices must be omitted. Hence, there are: $84 - 18 = 66$ effective ways six distances can be chosen from the nine available.

Figure 6:
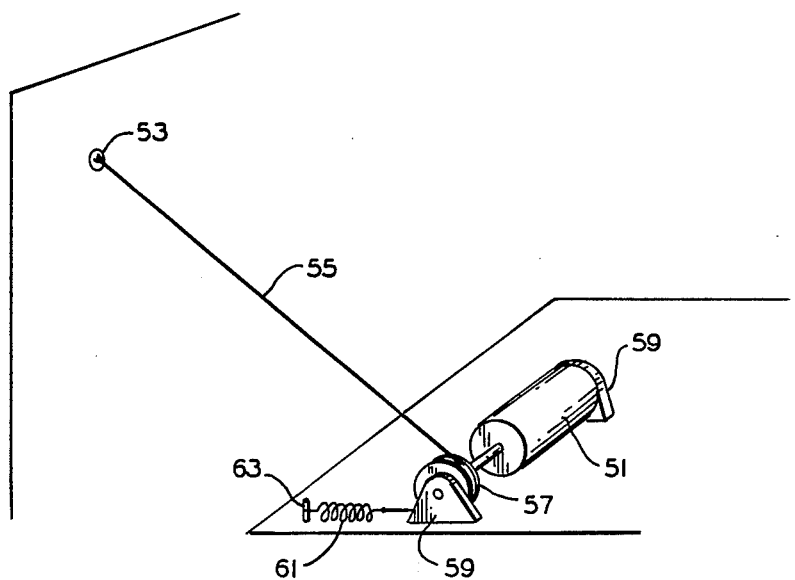
FIG. 6 is a perspective view illustrating portion of an alternate embodiment utilizing strings, or cord, or line, or cable rather than light or sound pulses.

FIG. 6 illustrates an alternate embodiment of the present invention. In this case, rather than utilizing pulses of sound or light energy, the measurement is made utilizing a string 15. A suitable fitting 53 is secured to the walls of the room 10 at each of the points S1, S2 and S3. For purposes of illustration, such a fitting 53 has been shown at the point S2. Fastened to it is a string 55 which extends around a pulley 57 on the end of the shaft on the shaft encoder 51. The pulley and shaft encoder are supported in suitable supports 59 on the motion platform 15. Three such shaft encoders will be provided at each of the positions E1, E2 and E3. For sake of example, only one shaft encoder at the position E2 is shown. The string 55 is wrapped around pulley 57 and then, for sake of illustration, is shown attached to a spring 61 which has its other end attached to a fitting 63 on the platform 15. Other types of retractor devices for retracting the line as it is played in and out with movement of the motion platform can equally well be provided. It will be recognized that as the platform moves and the distance of the point E2 from the point S2 changes the length of the line 55 will change. With this change in length will be a corresponding rotation of pulley 57 which will be transmitted to the shaft encoder 51. Thus, the output of the shaft encoder will be representative of the change in length of the string. This output is provided as one of the inputs to the emitter position calculators 37 of FIG. 3. Thus, there will be nine shaft encoders 51, three for each of the positions E1, E2 and E3 providing the necessary distance inputs to the emission position calculators 37 for the points E1, E2 and E3.

A mathematical procedure which can be used to obtain platform X, Y, Z, roll, pitch and yaw from the XYZ positions of each of the three emitters is now shown. Let the earth coordinates of the three emitter points be called $(x_{E1}, y_{E1}, z_{E1})$, $(x_{E2}, y_{E2}, z_{E2})$ and $(x_{E3}, y_{E3}, z_{E3})$. (As previously discussed, it is essential that these three emitter points do not all lie on the same straight line.) It is convenient to associate an axes system, called the emitter axes system, with these three points. Let the origin of the emitter axes system be at $(x_{E1}, y_{E1}, z_{E1})$. Let the positive X emitter axis have direction numbers $(x_{E2} - x_{E1}, y_{E2} - y_{E1}, z_{E2} - z_{E1})$. Let the positive Z emitter axis have direction numbers given by the cross product:

$$(q_1, q_2, q_3) \times (q_4, q_5, q_6) = (q_2 q_6 - q_3 q_5, q_3 q_4 - q_1 q_6, q_1 q_5 - q_2 q_4)$$

where:

$q_1 = x_{E2} - x_{E1}$ $q_2 = y_{E2} + y_{E1}$ $q_3 = z_{E2} + z_{E1}$ $q_4 = x_{E3} + x_{E1}$ $q_5 = y_{E3} + y_{E1}$ $q_6 = z_{E3} + z_{E1}$

Finally, let the positive Y emitter axes have direction numbers given by the cross product:

$(q_7, q_8, q_9) \times (q_1, q_2, q_3) = (q_8 q_3 - q_9 q_2, q_9 q_1 - q_7 q_3, q_7 q_2 - q_8 q_1)$ where:
$q_7 = q_2 q_6 - q_3 q_5$ $q_8 = q_3 q_4 - q_1 q_6$ $q_9 = q_1 q_5 - q_2 q_4$ These direction numbers yield the following emitter axes system to earth axes system direction cosines:

$p_{11} = q_1/N_1$ $p_{12} = q_7/N_3$ $p_{13} = q_4/N_2$ $p_{21} = q_2/N_1$ $p_{22} = q_8/N_3$ $p_{23} = q_5/N_2$ $p_{31} = q_3/N_1$ $p_{32} = q_9/N_3$ $p_{33} = q_6/N_2$ where:

$N_1 = (q_1^2 + q_2^2 + q_3^2)^{\frac{1}{2}}$ $N_2 = (q_4^2 + q_5^2 + q_6^2)^{\frac{1}{2}}$ $N_3 = (q_7^2 + q_8^2 + q_9^2)^{\frac{1}{2}}$ This direction cosines define the emitter axes system to earth axes system rotation shown below:

$$\begin{bmatrix} x_E \\ y_E \\ z_E \end{bmatrix} = \begin{bmatrix} p_{11} & p_{12} & p_{13} \\ p_{21} & p_{22} & p_{23} \\ p_{31} & p_{32} & p_{33} \end{bmatrix} \begin{bmatrix} x_{EM} \\ y_{EM} \\ z_{EM} \end{bmatrix}$$

where $(x_E, y_E, z_E)$ are the earth axes system coordinates of some point, and $(x_{EM}, y_{EM}, z_{EM})$ are the emitter axes coordinates of that same point, provided the emitter system is translated such that its origin is coincident with the origin of the earth axes.

In general, however, the desired motion platform axes system will not coincide with the emitter axes system, but will differ from the emitter axes system by a translation and rotation which are fixed with respect to the motion platform. Let the coordinates of the first emitter in the desired motion platform axes system (simply called the motion platform axes system) be $(x_{p1}, y_{p1}, z_{p1})$, and let the fixed rotation between the emitter axes system and the motion platform axes system be:

$$\begin{bmatrix} x_p \\ y_p \\ z_p \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} x_{EM} \\ y_{EM} \\ z_{EM} \end{bmatrix}$$

Then the rotation between the platform axes system and the earth axes system is:

$$\begin{bmatrix} x_E \\ y_E \\ z_E \end{bmatrix} = \begin{bmatrix} c_{11} & c_{12} & c_{13} \\ c_{21} & c_{22} & c_{23} \\ c_{31} & c_{32} & c_{33} \end{bmatrix} \begin{bmatrix} x_p \\ y_p \\ z_p \end{bmatrix}$$

where:

$c_{11} = p_{11} b_{11} + p_{12} b_{12} + p_{13} b_{13}$ $c_{12} = p_{11} b_{21} + p_{12} b_{22} + p_{13} b_{23}$ $c_{13} = p_{11} b_{31} + p_{12} b_{32} + p_{13} b_{33}$ $c_{21} = p_{21} b_{11} + p_{22} b_{12} + p_{23} b_{13}$ $c_{22} = p_{21} b_{21} + p_{22} b_{22} + p_{23} b_{23}$ $c_{23} = p_{21} b_{31} + p_{22} b_{32} + p_{23} b_{33}$ $c_{31} = p_{31} b_{11} + p_{32} b_{12} + p_{33} b_{13}$ $c_{32} = p_{31} b_{21} + p_{32} b_{22} + p_{33} b_{23}$ $c_{33} = p_{31} b_{31} + p_{32} b_{32} + p_{33} b_{33}$

The earth axes system coordinates of the origin of the platform axes system is $r_{E1} - r_{p1}$ where $r_{E1}$ is the vector to the first emitter and $r_{p1}$ is the vector from the origin of the platform axes to the first emitter. Thus, the earth axes coordinates of the origin of the platform axes system is given by:

$$\begin{bmatrix} x_{EP} \\ y_{EP} \\ z_{EP} \end{bmatrix} = \begin{bmatrix} x_{E1} \\ y_{E1} \\ z_{E1} \end{bmatrix} + \begin{bmatrix} c_{11} & c_{12} & c_{13} \\ c_{21} & c_{22} & c_{23} \\ c_{31} & c_{32} & c_{33} \end{bmatrix} \begin{bmatrix} -x_{p1} \\ -y_{p1} \\ -z_{p1} \end{bmatrix}$$

H where, $(x_{E1}, y_{E1}, z_{E1})$, the earth axes system coordinates of the first emitter point, are determined using the procedure previously discussed; the $c_{ij}$ (i,j, = 1,2,3) are determined by the procedure given above; and $(x_{p1}, y_{p1}, z_{p1})$, the platform axes system coordinates of the first emitter point, are known constants.

Clearly, the attitude of the platform axes system with respect to the earth axes system is specified by the $c_{ij}$, the platform axes system to earth axes system direction cosines. However, these directions cosines may not be meaningful to those interested in knowing the attitude of the motion platform with respect to the earth. Parameters which are meaningful to almost everyone interested in knowing the attitude of the motion platform with respect to the earth axes system are conventional aircraft Euler angles: heading, pitch and roll. These angles can be obtained from the $c_{ij}$ by using the following system of equations:

$\sin \theta_p = -c_{31}$ $\cos \theta_p = (c_{11}^2 + c_{21}^2)^{\frac{1}{2}}$ $\sin \psi_p = c_{21}/\cos\theta_p$ $\cos \psi_p = c_{11}/\cos\theta_p$ $\sin \phi_p = c_{32}/\cos\theta_p$ $\cos \phi_p = c_{33}/\cos\theta_p$ $\psi_p = \text{arc trig}(\sin \psi_p, \cos \psi_p)$ $\theta_p = \text{arc trig}(\sin \theta_p, \cos \theta_p)$ $\phi_p = \text{arc trig}(\sin \phi_p, \cos \phi_p)$ where arc trig denotes an arc trigonometric method for determining the value of an angle given that angle's sine and cosine, $\psi_p$ is the earth axes heading of the motion platform, $\theta_p$ is the earth axes pitch of the motion platform, and $\phi_p$ is the earth axes roll of the motion platform.

The equations for determining the $b_{ij}$ from conventional aircraft emitter axes system heading, pitch and roll angles are:

$b_{11} = \cos \theta_{EM} \cos \psi_{EM}$ $b_{12} = \sin \phi_{EM} \sin \theta_{EM} \cos \psi_{EM} - \cos \phi_{EM} \sin \psi_{EM}$ $b_{13} = \cos \phi_{EM} \sin \theta_{EM} \cos \psi_{EM} + \sin \phi_{EM} \sin \psi_{EM}$ $b_{21} = \cos \theta_{EM} \sin \psi_{EM}$ $b_{22} = \sin \phi_{EM} \sin \theta_{EM} \sin \psi_{EM} + \cos \phi_{EM} \cos \psi_{EM}$ $b_{23} = \cos \phi_{EM} \sin \theta_{EM} \sin \psi_{EM} - \sin \phi_{EM} \cos \psi_{EM}$ $b_{31} = -\cos \theta_{EM}$ $b_{32} = \sin \phi_{EM} \cos \theta_{EM}$ $b_{33} = \cos \phi_{EM} \cos \theta_{EM}$ where $\psi_{EM}$ is the platform axes system heading of the emitter axes system, $\theta_{EM}$ is the platform axes system pitch of the emitter axes system, and $\phi_{EM}$ is the platform axes system roll of the emitter axes system.

Obviously, the development just given can be generalized by replacing the earth axes system by any axes system which is considered to be fixed, and by replacing the platform axes system by any system which is considered to be moving.

Variants and refinements of the system include the following:

1. Protection from false sensing of emitted pulses. Means to accomplish this include the use of multiple pulses, shape-coding the pulses, and rejection of data that result in implausible calculated emitter positions.
2. Use of reflectors or retransmitters from sensors and/or emitters. In the motion platform application, each emitter need emit and each sensor need sense over much less than an omnidirectional solid angle. Thus, reflectors or retransmitters, such as corner cube or retroflectors covering such limited solid angles, could be used to provide relocation sensors and emitters. If used they are designed to occult the direct ray, and so that the travel time of a ray is nearly constant irrespective of where it impacts the reflector(s).
3. Sound (including ultrasound) can be used instead of light.
4. The system can use three separate sensors for each emitter.
5. The illustrated embodiment shows the emitters on the platform and the sensors affixed to the room. This can be reversed.
6. The required accuracy in measuring emitter to sensor distances depends on the geometry of their placement and the needed accuracy of the end-product x,y,z, roll, pitch and yaw.
7. An alarm can be triggered if platform position and/or rates exceed preset thresholds. One use of such an alarm would be to shut down the system if a leg broke.
8. If sound is used, the accuracy with which the leading edge of the pulse can be detected can have a significant effect on the precision of measurement of emitter to sensor distances, and hence on the precision of the final determination of platform position and attitude. If, for example, the sonic emitter has a frequency of 25 KHz and the precision of the sensor detection of the leading edge of the pulses is one cycle, the time indeterminacy would be 40 milliseconds, which at the nominal speed of sound (1100 ft/sec) would result in an emitter to sensor distance indeterminacy of $0.040 \times 1100 = 44$ feet. Hence, for sound to be used in the motion system application, a very high frequency, combined with an indeterminacy of a small fraction of a cycle will be necessary.

Furthermore, as an alternative to placing the three emitters on one body (e.g., the motion base) and the three sensors on the other (e.g., the room walls) each of the three emitters can be relocated with a sensor, say on the motion base, and corner reflector (retroflectors) can be placed in the three positions on the room walls. Since a corner reflector returns the light beam to its source, and provides the same beam length irrespective of where the ray hits it, this configuration works just as the previously described one, but with a beam path twice as long. Compared with the system having the three emitters on one body and the three sensors on the other, the corner reflector system has the following advantages and disadvantages.

Advantages:

(a) Since the active elements (sensors, emitters) are on one body (e.g., the motion base), wiring is minimized; the system is more compact.

(b) Since the beam path length is doubled, changes in beam path are also doubled, and hence sensitivity is doubled.

(c) If more than three sensors or emitters would have been required to assure three non-occulted rays, additional corner reflectors can be added more cheaply and with higher reliability.

Disadvantages:

(a) With the doubled path length, and the less than perfect reflectivity of the corner reflectors, the power of the emitter and/or the sensitivity of the sensor has to be increased by a factor of four plus.

(b) Co-location of sensor and emitter may pose design problems.

(c) Not suitable for systems using sound, rather than light.

As an alternate to measuring the travel time of a pulse from emitter to sensor, a Doppler method can be used. This starts with the platform at a reference position and attitude, and integrates over time the emitter velocity as sensed by changes in signal frequency at the As described in "Physics" by Hausmann and Slack, Second Edition, 1939 vanNostrand Company, Inc., pages 556-557, the observed pitch of a moving energy source is given by:

$$P = f\left[\frac{v}{v \pm s}\right]$$

where f is the frequency, v is the velocity of wave propagation, and s is the speed of the energy source. This equation can be rewritten as:

$$\pm s = v\left[\frac{f}{p} - 1\right]$$

when:

$\frac{f}{p} = 1, s = o$ (the source is stationary)

$\frac{f}{p} < 1, s < o$ (the source is moving closer)

$\frac{f}{p} 1, s > o$ (the source is moving away)

Thus, s can simply be written:

$$s = v\left[\frac{f}{p} - 1\right]$$

Hence, the change in distance from time $t_o$ to t is:

$$D = \int_{t_o}^{t} s\, d\tau$$

If it is not possible to position the sensors and emitters so that the paths between them are not occulted when one of the two systems is in certain positions/attitudes, additional sensors and/or emitters may be employed to assure that at least three emitters can illuminate three sensors irrespective of system position/attitude. This capability will provide redundant information on occasion; the extra information can be discarded or utilized.

Along the same vein as above, it may be desirable to design in redundant emitter-sensor paths, so that the final position/attitude determination is not dependent on any single emitter, sensor or measurement.

Alternate Uses

The invention disclosed herein can be used to either measure the relative position and attitude between two bodies or can be used to cause action to be taken whenever the relative position and attitude between two bodies exceeds predefined limits. For example, if the relative displacement between two bodies becomes large enough to cause a dangerous situation to exist, an alarm can be activated. Other examples of where it is desired to measure the relative position and attitude of two bodies are: the manipulator arm of a space shuttle, an industrial robot, a dredge, or the relative position and attitude of a tanker aircraft and an aircraft being refueled by the tanker aircraft.

What is claimed is:

1. A method of determining the position and attitude of a first body, with respect to a second body, comprising:
   (a) establishing three reference points which are not colinear on the first body;
   (b) independently establishing three reference points which are not colinear on the second body;
   (c) measuring at least six geometric parameters describing the relationship between reference points on said first body and reference points on the second body; and
   (d) computing from said geometric parameters the position and attitude of said first body with respect to said second body.

2. The method according to claim 1, wherein said six geometric parameters comprises six of the nine distances between said reference points on said first body and said referenced points on said second body.

3. The method according to claim 1, wherein said six geometric parameters comprise six of the angles associated with the three non-colinear points on said first body and three of the non-colinear points on said second body.

4. The method according to claim 1, wherein said six geometric parameters comprise distance measurements between reference points on said first and second bodies and angular measurements associated with the said reference points on said first and second bodies.

5. The method according to claim 1, wherein said reference points on each of the two bodies are used to provide more than six geometric parameters to provide redundant measurements and using said redundant measurements to improve the accuracy and/or reliability of the computation of the position and attitude of said first body with respect to said second body.

6. The method according to claim 1, wherein said step of measuring comprises:
   (a) disposing energy transmitters at three of said reference points;
   (b) disposing energy sensors at said same three reference points;
   (c) disposing means for retransmitting at the other three reference points;
   (d) sequentially radiating energy from each of said transmitters to each of said means for retransmitting, and back to each of said sensors;
   (e) measuring the time for said energy to travel between said transmitter and sensors; and
   (f) converting said times into distances by multiplying by the speed of propagation of said energy.

7. The method according to claim 1, wherein said step of measuring comprises:
   (a) disposing energy transmitters at three of said reference points;
   (b) disposing energy sensors at each of the other three of said reference points;
   (c) sequentially radiating energy from each of said transmitters to each of said sensors;
   (d) measuring the time for said energy to travel between transmitters sensors; and
   (e) converting said times into distances by multiplying by the speed of propagation of said energy.

8. The method according to claim 1, wherein said step of measuring comprises:
   (a) disposing three energy transmitters transmitting at known fixed frequencies at three of said reference points;
   (b) disposing three frequency sensors adapted to measure Doppler shift at the other three of said reference points;
   (c) radiating energy from each of said transmitters to each of said sensors;
   (d) measuring the Doppler shift at each sensor; and
   (e) converting said Doppler shift into distances by integration.

9. The method according to claim 7 or 8, wherein said energy is light energy.

10. The method according to claim 7 or 8, wherein said energy is sound energy.

11. The method according to claim 7 or 8, wherein said energy is electromagnetic energy.

12. The method according to claim 1, wherein said step of computing comprises for each point on one body:
   (a) disposing all of said reference points on the other body in a common plane;
   (b) determining the point where a line from each point on said first body intersects a line connecting two reference points in said second body at a 90° angle;
   (c) defining a right hand axis system having its origin at said point of intersection, its x axis along said connecting line, and its y axis in said plane; and
   (d) determining the location of said point on said first body in said right hand axis system.

13. The method according to claim 12, wherein said right-hand system is rotated with respect to said second body's axes and further including converting the location of said point in said right-hand axes system to its location in said fixed axes system.

14. The method according to claim 1, wherein said first body is a six degree of freedom motion base located in a room having walls and a ceiling and wherein said second body's axes system is referenced to said room.

15. The method according to claim 1, wherein said step of measuring comprises:
   (a) connecting a variable length string, cord, line, or cable between each of said reference points on said movable body and each of said reference points on said fixed body;
   (b) establishing an initial length of each of said strings; and
   (c) measuring the changes in length of each of said strings and adding and subtracting said differences to or from said initial length.

16. Apparatus for determining the position and attitude of a first body, with respect to a second body comprising:
   (a) means independently establishing three reference points which are not colinear on the first body;
   (b) means establishing three reference points which are not colinear on the second body;
   (c) means for measuring at least six geometric parameters describing the relationship between reference points on said first body and reference points on said second body;
   (d) means for computing from said parameters the position of each of the three reference points on the first body with respect to the second body; and
   (e) means for computing from said positions of said three reference points the position and attitude of said first body.

17. The apparatus according to claim 16, wherein said six geometric parameters comprises six of the nine distances between said reference points on said first body and said referenced points on said second body.

18. The apparatus according to claim 16, wherein said six geometric parameters comprise six of the angles associated with the three non-colinear points on said first body and three of the non-colinear points on said second body.

19. The apparatus according to claim 16, wherein said six geometric parameters comprise distance measurements between reference points on said first and second bodies and angular measurements associated with the said reference points on said first and second bodies.

20. The apparatus according to claim 16, wherein said reference points on each of the two bodies are used to provide more than six geometric parameters to provide redundant measurements and using said redundant measurements to improve the accuracy and/or reliability of the computation of the position and attitude of said first body with respect to said second body.

21. Apparatus according to claim 16, wherein said means for measuring comprise:
   (a) three energy transmitters located at three of said reference points;
   (b) three energy sensors located at the other three of said reference points;
   (c) means for sequentially radiating energy from each of said transmitters to each of said sensors;
   (d) means for measuring the time for said energy to travel from each transmitter to each sensor; and
   (e) means for converting said times into distances by multiplying by the speed of propagation of said energy.

22. Apparatus according to claim 16, wherein said means for measuring comprise:
   (a) three energy transmitters transmitting at know frequencies at three of said reference points;
   (b) three or more frequency sensors adapted to measure Doppler shift at the other three of said reference points;
   (c) means for radiating energy from each of the said transmitters to each of said sensors;
   (d) means for measuring the Doppler shift at each sensor; and
   (e) means for converting said Doppler shifts into distances by integration.

23. Apparatus according to claims 21 or 22, wherein said energy is electromagnetic energy.

24. Apparatus according to claim 21 or 22, wherein said energy is light energy.

25. Apparatus according to claim 21 or 22, wherein said energy is sound energy.

26. Apparatus according to claim 16, wherein said means for measuring comprise:
   (a) a variable length string or cord, line or cable connected between at least six of the nine paths between said reference points on said first body and said reference points on said second body;
   (b) means for establishing an initial length of each of said string and
   (c) means for measuring the changes in length of each of said string and for adding and subtracting said differences to or from said initial length.

27. Apparatus according to claim 29, wherein said first body is a six degree of freedom motion base located in a room having walls and a ceiling and wherein said second body's system is referenced in said room with said three reference points in said second body's axes system are located at the intersection of said walls and ceiling so that said plane is in said ceiling and wherein the Z axis in said right hand system points downward.

28. Apparatus according to claim 16, wherein:
(a) all of said reference points in said second body are located in a common plane; and
(b) said means for computing comprise for each point on said first body:
 (i) means for determining the point where a line from said point on said first body intersects a line connecting two reference points in said second body at a 90° angle;
 (ii) means defining a right hand axis system having its origin at said point of intersection, its x axis along said connecting line, and its y axis in said plane; and
 (iii) means for determining the location of said point on said first body in said right-hand axis system.

29. Apparatus according to claim 28 wherein said right-hand system is rotated with respect to said second body's axes system and further including means for converting the location of said point in said right-hand axes system to its location in said second body's axes system.

30. Apparatus according to claims 16, wherein said first body is a six degree of freedom motion base located in a room having walls and a ceiling and wherein said second body's axes system is referenced to said room.

* * * * *

UNITED STATES PATENT AND TRADEMARK OFFICE
CERTIFICATE OF CORRECTION

PATENT NO. : 4,853,863

DATED : August 1, 1989

INVENTOR(S) : Edwin COHEN and Brian J. WOYCECHOWSKY

It is certified that error appears in the above-identified patent and that said Letters Patent is hereby corrected as shown below:

In The Drawings:

| | |
|---|---|
| Fig. 1, 2nd Level Of boxes from top of figure, left box | change "TO FIXED FRAME" to -- TO 3 FIXED FRAME -- |
| Fig. 3 | change "YAU" to -- YAW -- |
| Fig. 4 | change angle variable "0" to --  -- |
| Fig. 5 | change angle variable "0" to --  -- |
| Fig. 5 | change side length variable "$(X_1^2 + y)^2 0^{1/2}$" to --$(X_1^2 + Y_1^2)^{1/2}$ -- |

In The Specification:

| Column | Line | |
|---|---|---|
| 3 | 67 | after "point" change "to" to -- on -- |
| 8 | 53 | change "=" to -- > -- |

UNITED STATES PATENT AND TRADEMARK OFFICE
CERTIFICATE OF CORRECTION

PATENT NO. : 4,853,863
DATED : August 1, 1989
INVENTOR(S) : Edwin COHEN and Brian J. WOYCECHOWSKY It is certified that error appears in the above-identified patent and that said Letters Patent is hereby corrected as shown below:

| Column | Line | |
|---|---|---|
| 11 | 4 | change "+" to -- - -- |
| 11 | 5 | change "+" to -- - -- |
| 11 | 7 | change "+" to -- - -- |
| 11 | 9 | change "+" to -- - -- |
| 11 | 11 | change "+" to -- - -- |
| 12 | 54 | delete "H" |
| 15 | 7 | after "the" insert -- emitter. -- |
| 15 | 32 | after "f/p" insert -- > -- |
| 19 | 1 | change "29" to -- 26 --. |

Signed and Sealed this

Seventh Day of August, 1990

Attest:

HARRY F. MANBECK, JR.

Attesting Officer          Commissioner of Patents and Trademarks